United States Patent [19]

Grube et al.

[11] Patent Number: 5,602,916
[45] Date of Patent: Feb. 11, 1997

[54] METHOD AND APPARATUS FOR PREVENTING UNAUTHORIZED MONITORING OF WIRELESS DATA TRANSMISSIONS

[75] Inventors: Gary W. Grube, Palatine, Ill.; Timothy W. Markison; Mathew A. Rybicki, both of Austin, Tex.

[73] Assignee: Motorola, Inc., Schaumburg, Ill.

[21] Appl. No.: 317,668

[22] Filed: Oct. 5, 1994

[51] Int. Cl.[6] .................................................... H04L 9/00
[52] U.S. Cl. .................................................... 380/21
[58] Field of Search .................................. 380/21, 23, 49

[56] References Cited

U.S. PATENT DOCUMENTS

| 5,144,667 | 9/1992 | Pogue et al. | 380/21 |
|---|---|---|---|
| 5,204,897 | 4/1993 | Wyman | 380/4 |
| 5,371,794 | 12/1994 | Diffie et al. | 380/21 |
| 5,483,596 | 1/1996 | Rosenow et al. | 380/21 |
| 5,499,297 | 3/1996 | Boebert | 380/21 |

Primary Examiner—David C. Cain
Attorney, Agent, or Firm—Christopher P. Moreno

[57] ABSTRACT

Preventing unauthorized monitoring of wireless data transmissions is accomplished by routing requests for data, from communication units (114) operating on wireless communication systems (101), to a security gateway (103) which determines a transmission security level, based on the type of data requested, the identity of the data requester, and the identity of the database containing the requested data. Once this is determined, the security gateway (103) establishes a secure communication with the communication unit according to the transmission security level. If the secure communication was successful, the security gateway (103) routes the requested data to the communication unit (114).

32 Claims, 4 Drawing Sheets

METHOD AND APPARATUS FOR PREVENTING UNAUTHORIZED MONITORING OF WIRELESS DATA TRANSMISSIONS

TECHNICAL FIELD OF THE INVENTION

The present invention relates generally to data distribution and in particular to a method and apparatus for detecting unauthorized monitoring wireless data transmissions.

BACKGROUND OF THE INVENTION

Wireless communication systems are known to include a plurality of communication units, a limited number of wireless communication resources, and a communication resource controller. A typical communication unit, which may be a mobile radio, portable radio, or radio/telephone, offers its user a variety of features, such as group calls (i.e., one-to-many communications), telephone interconnect calls (i.e., one-to-one communications), and data communications. To access one of these services, the user must request access to one of the limited number of wireless communication resources and specify the type of service requested. This request is sent from the communication unit to the communication resource controller via a control channel, wherein the control channel is one of the communication resources that has been selected to function as the control channel. Upon receiving the request, the communication resource controller determines whether this particular communication unit is authorized to access the requested service and, if so, whether a communication resource is available for allocation. When both conditions are positive, the communication resource controller allocates a communication resource to the requesting communication unit such that the user can access the requested service.

In addition to allocating a communication resource, the communication resource controller may also need to establish a communication path within a public data communication interconnect system, such as a public switch telephone network (PSTN), to complete the service request. For example, if the requested service is for a data communication, in which the user is requesting that a data file be transferred to it via the wireless communication system, the communication resource controller would need to allocate a wireless communication resource to the requesting communication unit and also establish a wireline communication path with the holder of the requested data file via the public data system. Once both of these communication paths (i.e., the wireless path and the wireline path) have been established, the requested data file can be transferred to the requesting communication unit.

The above described data transfer is becoming more and more common as technological advances occur in both the wireless art and the wireline art. These technologic advances are allowing more data to be transferred in less time via data compression, time division multiplexing, quadrature amplitude modulation techniques, ADSL, MPEG standards, ISDN, and spread spectrum techniques. As the amount and frequency of data transmissions increase, so does the chance for illicit reception of the data. Illicit reception of data transmissions, which may include video data (i.e., movies), audio data (i.e., music or conversations), data files (e.g. police files, books, etc.), occur by having an RF receiver in range of a wireless communication system to receive the data transmissions. Recall that for a wireless transmission, an antenna transmits the data in a radial pattern, such that any properly tuned receiver within the radial pattern may receive the transmission.

In a typical wireless communication system, before the data is transmitted, the requesting communication unit or units are addressed via the control channel and instructed to affiliate with another communication resource to receive the data transmission. Even though all the communication units within range of the control channel's antenna receive the addressing information, only the communication unit or units that are addressed will affiliate with the communication resource. In an ideal system (i.e., one without units illicitly receiving data transmission), only the authorized communication units receive the requested data. Unfortunately, there are few, if any, ideal systems left, thus illicit reception is a real and serious problem costing the owners of the data millions of dollars in lost revenue.

Therefore, a needs exists for a method and apparatus that prevents unauthorized reception of wireless data transmissions based on the sensitivity of the data being transmitted.

DETAILED DESCRIPTION OF A PREFERRED EMBODIMENT

Generally, the present invention provides a method and apparatus for preventing unauthorized monitoring of wireless data transmissions. This is accomplished by routing a wireless communication unit's request for a data transmission to a security gateway. Upon receiving the request, the security gateway determines a transmission security level, based on the type of data requested, the identity of the wireless communication unit, and the identity of the database containing the requested data. Once this is determined, the security gateway establishes a secure communication with the wireless communication unit according to the transmission security level. Having established the secure communication, the security gateway routes the request to the database containing the requested data. With such a method and apparatus, data is transmitted from the wireless communication system to communication units using an appropriate security level such that a balance is struck between the risk of unauthorized monitoring of wireless data transmissions and data transmission complexity and cost.

Figure 1:
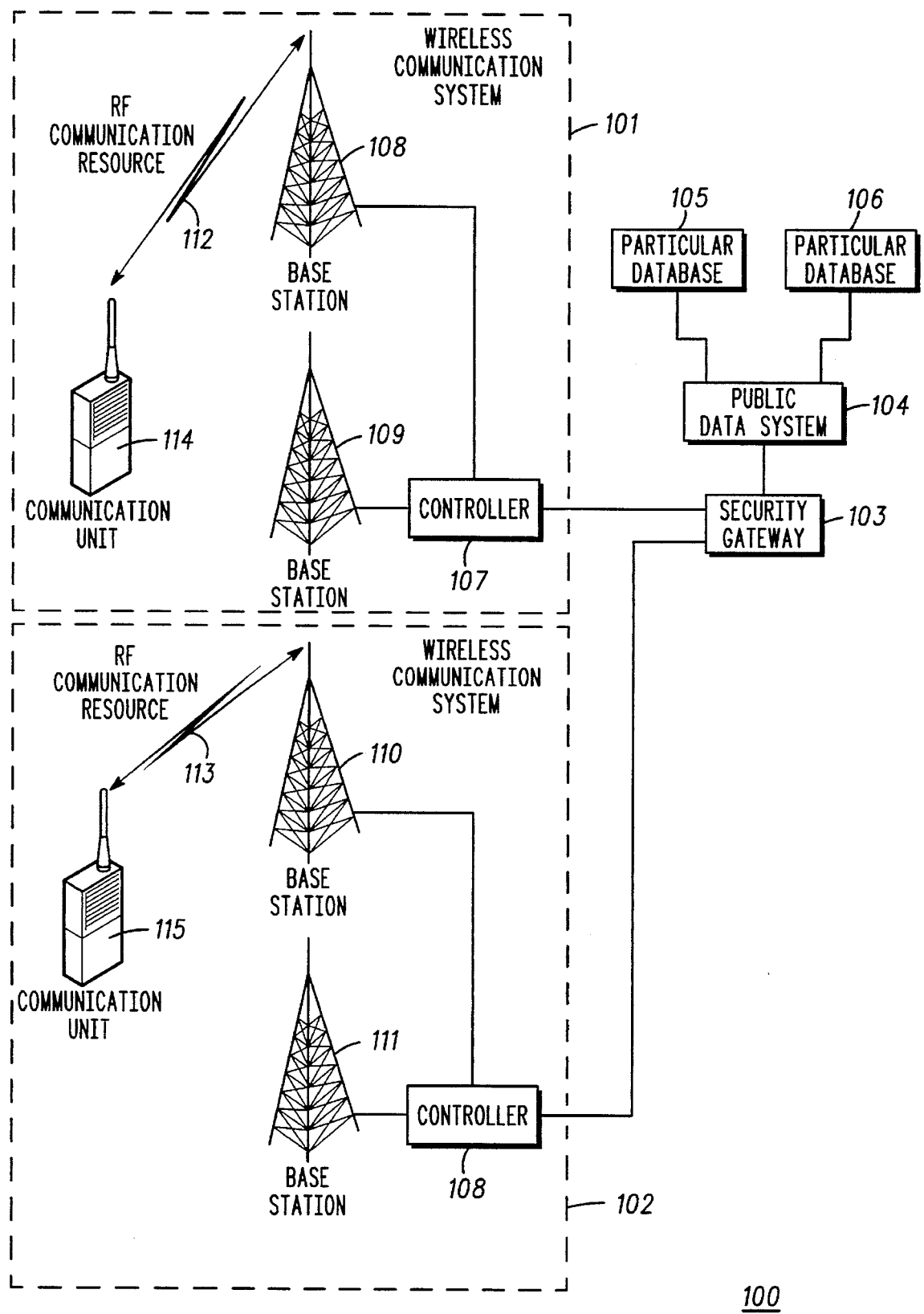
FIG. 1 illustrates a communication environment in accordance with the present invention.

FIG. 1 illustrates a communication environment 100 that includes wireless communication systems 101–102, a security gateway 103, a public data system 104, and data distributors 105–106. Each of the wireless communication system 101–102 includes a controller 107–108, base stations 108–111, radio frequency (RF) communication resources 112–113, and communication units 114–115. Communication units 114–115 transceive information over allocated communication resources 112–113 with the base stations 108–111, wherein allocation of the RF communication resources is controlled by the controller 107. The information transceived over the RF communication resources 112–113 includes control information and data information. The control information includes requests for service, status information, and resource allocation information and is transceived over the control channel, while data information includes voice data, text data, audio data, video data, company financial records, historical records, survey data, multimedia data, or any other information that is available in an electronic form and is transmitted over working channels, i.e., the RF communication resources allocated by the controller 107–108.

When the communication unit 114–115 is requesting a data transmission from a data distributor 105–106, the controller 107–108 needs to establish a wireless and wireline between the data distributor 105–106 and the communication unit 114–115. Once the paths are established, the data distributor 105–106, which may be a data warehouse that distributes the data information, routes the requested data to the communication unit via these paths. Typically, the data distributor will only transfer this data for a fee to a registered communication unit user. If, when the data distributor receives the request, the requesting communication unit is not identified as a registered communication unit user, the data distributor will not forward the data. For example, assume that the data distributor, or particular database, 105–106 stores digitized versions of video movies and distributes them for a fee. Thus, each time a valid request is received, (i.e., the requesting unit is a registered communication unit user) the database operator transmits the requested movie and collects a fee for its service.

Prior to the wireless and wireline paths being established, the controller 107–108 routes the request to the security gateway. The security gateway 103 is coupled between the wireless communication systems 101 102 and the public data system 104, wherein the public data system 104 may comprise a cable TV network, an Asynchronous Transfer Mode (ATM) network, an X.25 data network or a multitude of other data transfer networks. Generally, the security gateway 103 receives requests from the communication units 114–115 via the wireless communication systems 101–102, checks to determine if an appropriate security level can be obtained for transmission, and, if so, routes the request to the addressed database 105, 106, 117 via the public data system. To determine whether the appropriate security level can be obtained, the security gateway 103 interprets the request to determine the type of data requested, the identity of the requesting communication unit, and the identity of the target database. For example, the type of data may refer to publicly available files, like population statistics, or very valuable files, like computer network access codes. The database operator may have certain security guidelines for each data type. For example, it may be acceptable to transmit data of low value over an unencrypted wireless communication resource, and it may be necessary to use an encryption algorithm with a very high level of security to transmit data of high value over an encrypted wireless communication resource.

From this information, the security gateway 103 determines the required transmission security level. The level may dictate the class of encryption to be used and/or it may specify a reference to a particular encryption key. The security gateway will also determine a unique user key based on the identity of the data requester, or requesting communication unit. For example, both the communication unit 114–115 and the security gateway 103 contain a predetermined static key or an identical predetermined dynamic key algorithm such that the security gateway 103 is able to communicate transmission security level information to the communication unit 114–115 with minimal risk of interception. With the dynamic key algorithm, only the target communication unit will be capable of automatically recovering the transmitted data.

Having determined the transmission security level, the security gateway 103 informs the requesting communication unit of the transmission security level. Once the communication unit 114–115 has loaded the transmission security level, the security gateway 103 attempts to establish a secure communication with the communication unit 114–115 . If the secure transmission is established, the security gateway 103 routes the request to the appropriate database via the public data system 104. The information transmitted during the establishment of the secure communication may be a pattern that assures proper encryption and decryption. In addition, it will be appreciated by one skilled in the art that a wireless communication resource must be allocated to the communication unit prior to the establishment of the secure communication.

Figure 2:
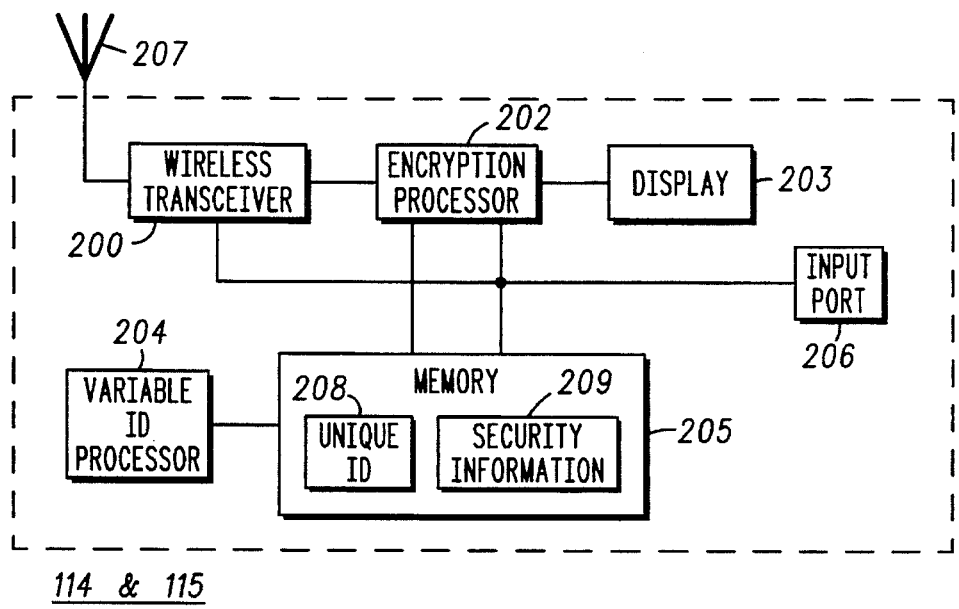
FIG. 2 illustrates a schematic block diagram of a communication unit in accordance with the present invention.

FIG. 2 illustrates a communication unit 114–115 that incorporates an embodiment of the present invention. As shown, the communication unit 114–115 includes a wireless transceiver 200, an encryption processor 202, a display 203, a variable identification (ID) processor 204, memory 205, an input port 206 and an antenna 207. The transceiver 200 is a wireless transceiver that provides RF communication capabilities, such as a time division multiple access (TDMA) or frequency division multiple access (FDMA). The memory 205, which may be any medium for storing digital information, such as a CD ROM, RAM, ROM, a disc, magnetic storage, contains a unique identification code section 208 and security information section 209. The unique identification code sections 208 stores a unique user key, which may be variable or static, while the security information section 209 stores a list of transmission security levels. The variable unique user key is generated by the variable ID processor 204, which may be a digital signal processor or an application specific integrated circuit (ASIC), or another type of processor, based on a predetermined variation algorithm prestored in the security information section 209 memory. The encryption processor 202, which may be a microprocessor such as a 68040 manufactured by Motorola, Inc., decrypts received data based on the unique user key and the transmission security level. The decrypted data may then be displayed on the display 203, wherein the display 203 provides an image of received data. The display 203 may be a liquid crystal display (LCD) or another type of display.

In operation, the communication unit 114–115 requests a data transmission by first receiving, via the input port 206, a command from an external data device, such as data terminals, laptop computers, or personal organizers. The command is formatted into a request by the transceiver 200 and forwarded to the security gateway 103 via the wireless communication system 101–102 . Formatting of the request involves generating an inbound signaling word (ISW) that identifies the communication unit and the type of services requested, such that the controller 107 of the wireless system knows to forward the request to the security gateway 103. Upon receipt of the request, the security gateway transmits a transmission security level message to the communication unit. The transmission security level message informs the communication unit as to what security level and unique user key to load into the encryption processor 202. As mentioned, the security information section 209 stores the security level information, which may contain various types of encryption algorithms, such as DES, interleaving, etc.

FIG: 3 illustrates a security gateway 103 that incorporates an embodiment of the present invention. As shown, the security gateway includes an encryption processor 300, a transceiver 301, memory 302, a variable ID processor 303, and a data entry device 304. The security gateway 103 could be implemented in discrete components or a computer, such as a VME Computer manufactured by Motorola, Inc., that includes a processor 300, memory 302, data entry 304 and is further equipped with a transceiver 301 and a variable ID processor 303. The transceiver 301 provides an electrical interface with the wireless communication system controllers 107 108 and the public data system 104. For the discrete implementation, the processor 300 could be a microprocessor, such as a 68040 manufactured by Motorola, Inc., or any other processor or digital signal processor suited for encrypting real time data streams, while the memory 302 is any digital storage element. The data entry 304, which may be a keyboard, key pad, or the like, is used to enter the required security level information and to enter and retrieve security gateway 103 maintenance and alarm information that is typical with computer systems. In either the discrete implementation or the VME computer implementation, the transceiver 301 is capable of interfacing with one public data system 104 and up to ten wireless communication systems 101–102.

Figure 3:
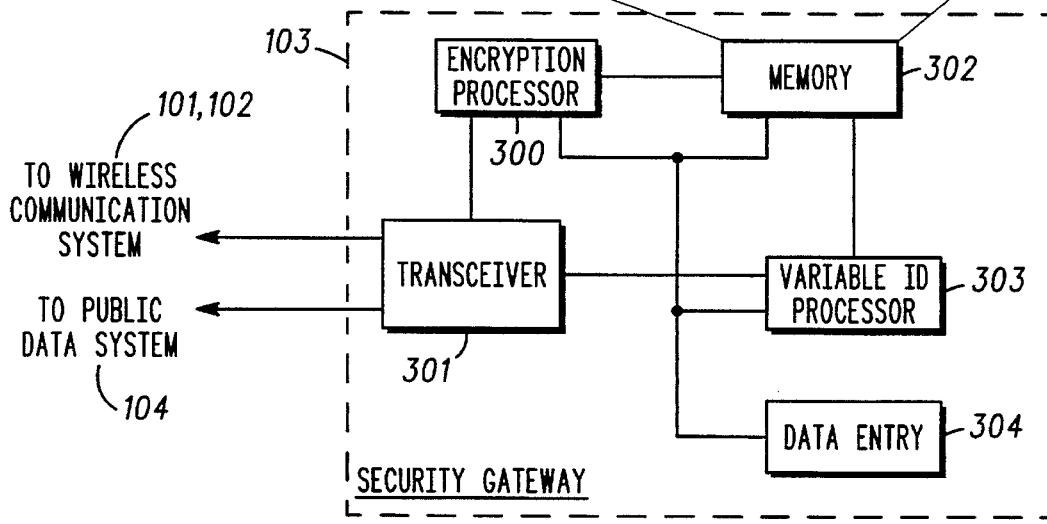
FIG. 3 illustrates a schematic block diagram of a security gateway in accordance with the present invention.

The encryption processor 300 determines, by accessing the memory 302, the transmission security level 308 based on type of data requested 306, the target database 307, and the identity of the requesting communication unit 307. Thus, by doing a simple table look-up, the security gateway can determine the transmission security level and transmit this information, to the requesting communication unit. Note that the security gateway, for each communication unit, must be programmed with the identical predetermined static key or variable ID algorithm such that only the security gateway and the requesting communication unit are capable of decoding the transmission security level and subsequent data transmissions. To further illustrate the security level database structure, the memory 302 is organized into entries 309–310 by the identity of the communication units. For example, as depicted in FIG. 3, when communication unit 1111 requests data type B from target database AA, the security gateway 103 is required to use security level 1 for subsequent transmissions of data to the communication unit.

Figure 4:
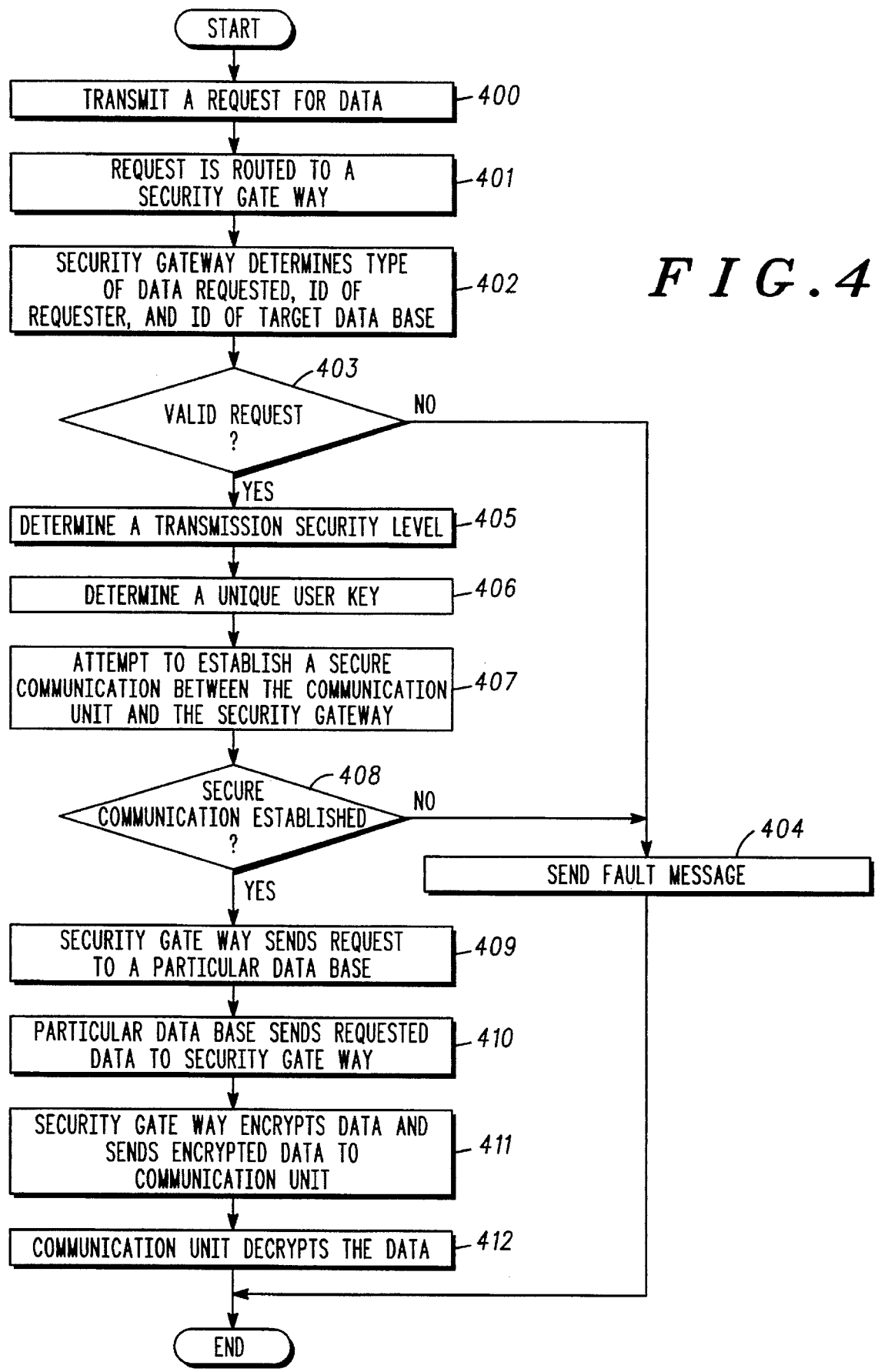
FIG. 4 illustrates a logic diagram that may be used to implement an embodiment of the present invention.

FIG. 4 illustrates a logic diagram that may be used to implement an embodiment of the present invention. At step 400, after receiving a request for data from an external computing device, such as a laptop computer, attached to the input port of the communication unit, the communication unit formats and transmits a request to the wireless communication system. The wireless communication system controller determines whether the request requires access to an external database, and, if so, routes the request to a security gateway in step 401. Next, at step 402, the security gateway examines the request to determine the type of data requested, the ID of the requester, and the ID of the target database. These identifications are ID fields embedded in the request message. Next, at step 403, the security gateway determines if this request is valid by searching the security gateway memory for an entry that specifies the current combination of type of data requested, ID of the requester, and ID of the target database. These combinations are predetermined and entered by the operator of the security gateway. Normally this prearrangement is coordinated by the operator of the security gateway and it may be dictated by the operator of the database in order to achieve a certain level of security.

If the request is not valid, then a fault message is sent, in step 404, to the data entry device of the security gateway such that the security gateway operator is alerted of the condition, which enables the operator to action to prevent unauthorized monitoring of data transmissions. The fault message would indicate that a request was received that was not valid. The fault message would also include information regarding the type of data requested, the ID of the requester, the ID of the target database, the wireless communication system identification (ID), the date, and the time of the event.

If, however, the request is valid, as determined in step 403, the security gateway determines, at step 405, the necessary security level, where the security level is one of an algorithm, a key, or algorithm-key function for the subsequent encryption process. This determination is made based on the security field entry in the database corresponding to the current type of data requested, the identity of the particular database, and the identity of the communication unit. It is also possible to determine a security level based on the current identity of the wireless communication system through another field in the database correlating security levels and communication system ID's. Next, in step 406, the security gateway determines the unique user key for the current requesting communication unit. The unique user key can either be a predetermined static numerical value key or a time variant function programmed by a system manager into the communication unit and the security gateway.

In step 407, the security gateway attempts to establish a secure communication with the communication unit using the unique user key and a default decryption code. The default decryption code specifies a default encryption algorithm which is used to encrypt a message informing the communication unit of the specified transmission security level. As is typical with such wireless communication system commands, the communication unit will respond to this command by transmitting an acknowledgment using the new transmission security level parameters. The security gateway is expecting this response and, at step 408, checks for the acknowledgment within a normal window of time which allows for transmission and processing delays. If the acknowledgment is not received or if the acknowledgment was not constructed with the proper transmission security level parameters, then a fault message is sent at step 404. The fault message would indicate that a secure communication could not be established with a communication unit that has just requested data which required a particular level of transmission security. The fault message would also include information regarding the type of data requested, the ID of the requester, the ID of the target database, the wireless communication system identification (ID), the date, the time of the event, and the attempted transmission security level.

If, however, the secure communication was established, then the security gateway will send, in step 409, the communication unit's request to the particular targeted database. The request is carried by the public data system from the security gateway to the target database. In step 410, the database sends the requested data back to the security gateway through the public data system. Next, at step 411, the security gateway encrypts the data, according the transmission security level determined at step 405, and transmits the encrypted data to the communication unit over an allocated RF communication resource, wherein the security level may range from no encryption to the most complex Type 1 Federal Encryption Standard. After receiving the encrypted data, the communication unit decrypts the data in step 412. To do this, the communication unit applies the encryption algorithm and key specified in the transmission security level as established in step 407. The decrypted data is then transferred to the communication unit display. In some other embodiments, the data may alternately be stored in a communication unit memory or it may be transferred to an external computing device, such as a laptop computer, for more processing. Regardless of where the decrypted data is present, with such a method and apparatus, only the targeted communication unit will receive security sensitive data and it will be transmitted at the appropriate security level.

Figure 5:
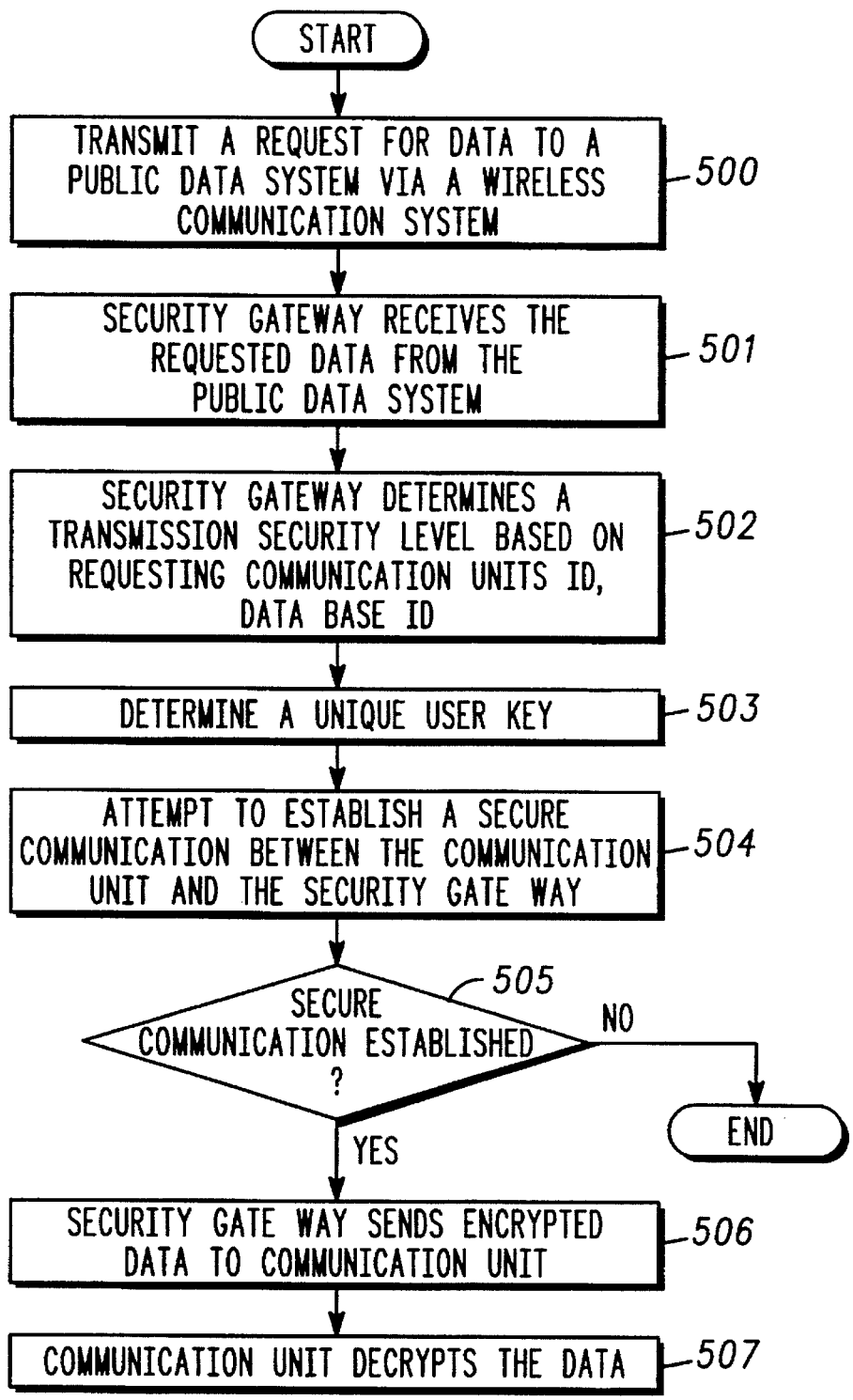
FIG. 5 illustrates a logic diagram that may be used to implement an alternate embodiment of the present invention.

FIG. 5 illustrates a logic diagram that may be used to implement an alternative embodiment of the present invention. At step 500, after receiving a request for data from an external computing device, the communication unit formats and transmits a request to the wireless communication system. The wireless communication system controller determines whether the request requires access to an external database and, if so, routes the request to the public data system. The public data system has one or more databases operably coupled to the public data system such that requests from the wireless communication systems will result in data responses from the databases back through the public data system to the security gateway as shown in step 501.

Next, at step 502, the security gateway determines a transmission security level based on the ID of the requester, and the ID of the source database contained within the transmitted data, wherein the transmission security level is one of an algorithm, a key, or algorithm-key function. This determination is made based on the security field entry in the database corresponding to the current identity of the particular database, and the identity of the communication unit. It is also possible to determine a security level based on the current identity of the wireless communication system through another field in the database correlating security levels and communication system ID's.

Next, in step 503, the security gateway determines the unique user key for the current requesting communication unit. The unique user key can either be a static numerical value predetermined key or a time variant function programmed by a system manager into the communication unit and the security gateway. In step 504 the security gateway attempts to establish a secure communication between the communication unit and the security gateway by using the unique user key, and a default decryption code. The default decryption code is used to encrypt a message which informs the communication unit of the specified transmission security level. As is typical with such wireless communication system commands, the communication unit will respond to this command by transmitting an acknowledgment using the new transmission security level parameters. The security gateway is expecting this response and, at step 505, checks for the acknowledgment within a normal window of time which allows for transmission and processing delays. If the acknowledgment is not received, or if the acknowledgment was not constructed with the proper transmission security level parameters, then the process ends and the data is not transmitted to the wireless communication system from the security gateway. In addition, a fault message may be sent to the data entry device on the security gateway. The fault message would indicate that a secure communication could not be established and information regarding the type of data requested, the ID of the requester, the ID of the target database, the wireless communication system identification (ID), the date, the time of the event, and the attempted transmission security level.

If, however, the secure communication was established, and verified at step 505, then the security gateway will, at step 506, encrypt the data, according the transmission security level determined at step 502, and transmit the encrypted data to the communication unit. After receiving the encrypted data, the communication unit decrypts the data in step 507. To do this, the communication unit applies the encryption algorithm and key specified in the transmission security level as established in step 504. The decrypted data is then transferred to the communication unit display. In some other embodiments the data may alternately be stored in a communication unit memory or it may be transferred to an external computing device, such as a laptop computer, for more processing.

The present invention provides a method and apparatus for preventing unauthorized monitoring of wireless data transmissions. This is accomplished by routing requests for data, from communication units 114 operating on wireless communication systems 10 1, to a security gateway 103 which determines a transmission security level, based on the type of data requested, the identity of the data requester, and the identity of the database containing the requested data. Once this is determined, the security gateway 103 establishes a secure communication with the communication unit according to the transmission security level. If the secure communication was successful, the security gateway 103 routes the requested data to the communication unit 114. With such a method and apparatus, data is transmitted from the wireless communication system to communication units using an appropriate level of transmission security such that a balance is struck between the risk of unauthorized monitoring of wireless data transmissions and data transmission complexity and cost.

We claim:

1. In a communication system environment that includes a wireless communication system operably coupled to a public data system, wherein the wireless communication system includes a plurality of communication units, a method for preventing unauthorized monitoring of wireless data transmissions to a communication unit of the plurality of communication units, the method comprising:

a) transmitting, by the communication unit, a request for data to the wireless communication system;

b) routing, by the wireless communication system, the request to a security gateway;

c) determining, by the security gateway, type of data requested, identity of the communication unit, and identity of a particular database of the public data system that contains the data requested;

d) determining, by the security gateway, a transmission security level;

e) determining, by the security gateway, a unique user key of the communication unit;

f) attempting, by the security gateway, to establish a secure communication with the communication unit based on the unique user key and the transmission security level; and g) when the secure communication is established, routing, by the security gateway, the request to the particular database.

2. The method of claim 1, wherein step (e) further comprises identifying the unique user key as a time variant function programmed into the communication unit and the security gateway.

3. The method of claim 1, wherein step (e) further comprises identifying the unique user key as a static numerical value stored in both the communication unit and the security gateway.

4. The method of claim 1 further comprises:

h) routing, by the particular database, requested data to the security gateway;

i) encrypting, by the security gateway, the requested data based on the unique user key and the transmission security level to produce encrypted data; and j) routing, by the security gateway, the encrypted data to the communication unit via the wireless communication system.

5. The method of claim 4 further comprises:

k) decrypting, by the communication unit, the encrypted data using a default decryption code.

6. The method of claim 5 wherein step (f) further comprises transmitting, by the security gateway, the default decrypting code during the secure communication.

7. The method of claim 1, wherein step (d) further comprises:

determining the transmission security level to be one of an algorithm, a key, or algorithm-key function.

8. The method of claim 1, wherein step (d) further comprises determining the transmission security level based on at least one of the type of data requested, identity of the particular database, or identity of the communication unit.

9. The method of claim 1, wherein step (d) further comprises:

determining, by the security gateway, identity of the wireless communication system; and determining the transmission security level based on the identity of the wireless communication system.

10. The method of claim 1, wherein step (e) further comprises:

receiving, by the communication unit and the security gateway, the unique user key from a system manager.

11. In a communication environment that includes a wireless communication system operably coupled to a public data system, wherein the wireless communication system includes a plurality of communication units, a method for a communication unit of the plurality of communication units to receive authorized data transmissions, the method comprising:

a) transmitting a request for data to the wireless communication system;

b) determining a unique user key and a transmission security level;

c) establishing a secure communication based on the unique user key and the transmission security level; and d) decrypting encrypted data using a default decryption code, wherein the default decryption code is based on the unique user key and the transmission security level.

12. The method of claim 11, wherein step (b) further comprises determining the unique user key as a time variant function programmed into the communication unit.

13. The method of claim 11, wherein step (b) further comprises determining the unique user key as a static numerical value stored in the communication unit.

14. The method of claim 11, wherein step (b) further comprises:

receiving the unique user key from a system manager.

15. A method for a security gateway to prevent unauthorized monitoring of wireless data transmissions, the method comprising:

a) receiving a request for data;

b) determining type of data requested, identity of requesting unit, and identity of a particular database that contains the data;

c) determining a transmission security level;

d) determining a unique user key of the requesting unit;

e) attempting to establish a secure communication with the requesting unit based on the unique user key and the transmission security level; and f) when the secure communication is established, routing the request to the particular database.

16. The method of claim 15 further comprises:

g) routing, by the particular database, requested data to the security gateway;

h) encrypting, by the security gateway, the requested data based on the unique user key and the transmission security level to produce encrypted data; and i) routing, by the security gateway, the encrypted data to the requesting unit via a wireless communication system.

17. The method of claim 15, wherein step (c) further comprises:

determining the transmission security level to be one of an algorithm, a key, or algorithm-key function.

18. The method of claim 15, wherein step (c) further comprises determining the transmission security level based on at least one of the type of data requested, identity of the particular database, or identity of the requesting unit.

19. The method of claim 15, wherein step (d) further comprises:

receiving, by the requesting unit and the security gateway, the unique user key from a system manager.

20. A communication unit for use in a wireless communication system and for receiving data from a public data system, the communication unit comprising:

a wireless transceiver, an encryption processor operably coupled to the wireless transceiver, wherein the encryption processor decrypts received data based on a unique user key and a transmission security level;

memory operably coupled to the encryption processor, wherein the memory stores the unique user key and transmission security level;

a variable identification processor, operably coupled to the memory for varying the unique user key based on a predetermined variation algorithm; and a display operably coupled to the encryption processor, wherein the display provides an image of received data.

21. The communication unit of claim 20 further comprises an input port that is operably coupled to the memory and the encryption processor, wherein the input port receives data requests.

22. A security gateway for using in a wireless communication system and for prevention unauthorized monitoring of data transmissions, the security gateway comprises:

a transceiver that provides a communication path with the wireless communication system and a public data system;

a variable identification processor for providing a unique user key based on a time variant function;

an encryption processor operably coupled to the transceiver, wherein the encryption processor determines a transmission security level based on type of data requested and a unique user key of a requesting unit;

memory operable coupled to the encryption processor and the variable identification processor, wherein the memory stores the unique user key and the transmission security level.

23. The security gateway of claim 22 wherein the memory further stores, as the transmission security level, the type of data, identity of a data base, identity of a requesting unit, and security level.

24. In a communication environment that includes a wireless communication system operably coupled to a public data system, wherein the wireless communication system includes a plurality of communication units, a method for preventing unauthorized monitoring of wireless data transmissions to a communication unit of the plurality of communication units, the method comprising:

a) transmitting, by the communication unit, a request for data to the wireless communication system;

b) routing, by the wireless communication system, the request to the public data system;

c) receiving, by a security gateway, the data from the public data system;

d) determining, by the security gateway, transmission security level based on identity of the communication unit, and identity of a particular database of the public data system that contains the data;

e) determining, by the security gateway, a unique user key of the communication unit based on the identity of the communication unit;

f) attempting, by the security gateway, to establish a secure communication with the communication unit based on the unique user key and the transmission security level; and g) when the secure transmission is established, transmitting, by the security gateway, the data to the communication unit.

25. The method of claim 24, wherein step (e) further comprises identifying the unique user key as a time variant function programmed into the communication unit and the security gateway.

26. The method of claim 24 step (g) further comprises:

encrypting, by the security gateway, the data prior to the step of transmitting to produce encrypted data.

27. The method of claim 26 further comprises:

h) decrypting, by the communication unit, the encrypted data using a default decryption code.

28. The method of claim 27 further comprises transmitting, by the security gateway, the default decrypting code during the secure communication.

29. A method for a security gateway to prevent unauthorized monitoring of wireless data transmissions, the method comprising:

a) receiving data from a data base of a public data system;

b) determining type of data, identity of requesting unit, and identity of the database;

c) determining a transmission security level;

d) determining a unique key of the requesting unit;

e) attempting to establish a secure communication with the requesting unit based on the unique user key and the transmission security level; and f) when the secure communication is established, routing the data to the requesting unit.

30. The method of claim 29 further comprises:

prior to routing the data, encrypting the data based on the unique user key and the transmission security level to produce encrypted data.

31. The method of claim 29, wherein step (c) further comprises:

determining the transmission security level to be one of an algorithm, a key, or algorithm-key function.

32. A method comprising the steps of:

a) receiving a request from a requesting communication unit over a wireless communication resource for data, wherein at least part of the data is stored in a first database;

b) automatically selecting a particular transmission security level from amongst a plurality of transmission security levels in response to receiving the request, to provide a selected transmission security level;

c) using the selected transmission security level when providing at least some of the data to the requesting communication unit.

* * * * *

UNITED STATES PATENT AND TRADEMARK OFFICE
CERTIFICATE OF CORRECTION

PATENT NO. : 5,602,916
DATED : February 11, 1997
INVENTOR(S) : Gary W. Grube, Timothy W. Markison, Mathew A. Rybicki It is certified that error appears in the above-indentified patent and that said Letters Patent is hereby corrected as shown below:

Column 8, line 32, claim 1 please change "envoronment" to --environment--.

Column 10, line 64, claim 22 please change "operable" to --operably--.

Column 12, line 13, claim 29 please insert --user-- in between "unique" and "key".

Signed and Sealed this

Thirteenth Day of May, 1997

Attest:

BRUCE LEHMAN

Attesting Officer

Commissioner of Patents and Trademarks